(12) United States Patent
Kolbly

(10) Patent No.: US 10,200,388 B2
(45) Date of Patent: *Feb. 5, 2019

(54) AUTOMATED SECURITY ANALYTICS PLATFORM WITH MULTI-LEVEL REPRESENTATION CONVERSION FOR SPACE EFFICIENCY AND INCREMENTAL PERSISTENCE

(71) Applicant: Alert Logic, Inc., Houston, TX (US)

(72) Inventor: Donovan Kolbly, Austin, TX (US)

(73) Assignee: Alert Logic, Inc., Houston, TX (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/054,488

(22) Filed: Feb. 26, 2016

(65) Prior Publication Data

US 2016/0182551 A1    Jun. 23, 2016

Related U.S. Application Data

(63) Continuation of application No. 13/677,152, filed on Nov. 14, 2012, now Pat. No. 9,306,947.

(51) Int. Cl.
*G06F 11/00* (2006.01)
*H04L 29/06* (2006.01)
*G06F 15/167* (2006.01)

(52) U.S. Cl.
CPC ........ *H04L 63/1425* (2013.01); *G06F 15/167* (2013.01); *H04L 63/10* (2013.01); *H04L 63/1408* (2013.01); *H04L 63/20* (2013.01)

(58) Field of Classification Search
CPC ....... G06F 21/00; G06F 21/552; H04L 63/10; H04L 63/1408; H04L 63/20
See application file for complete search history.

(56) References Cited

U.S. PATENT DOCUMENTS

| | | | | |
|---|---|---|---|---|
| 6,438,559 | B1* | 8/2002 | White | G06F 17/30607 |
| 6,609,130 | B1* | 8/2003 | Saulpaugh | G06F 17/30607 |
| | | | | 707/917 |
| 6,928,488 | B1* | 8/2005 | de Jong | G06F 9/4493 |
| | | | | 709/246 |
| 7,555,506 | B2* | 6/2009 | Venkatesh | G06F 9/4493 |
| 7,640,591 | B1* | 12/2009 | Tripathi | H04L 63/1458 |
| | | | | 726/22 |
| 8,065,396 | B2* | 11/2011 | Tapuska | H04L 51/26 |
| | | | | 709/219 |
| 9,306,947 | B2* | 4/2016 | Kolbly | H04L 63/1408 |
| 2002/0161848 | A1* | 10/2002 | Willman | G06F 9/54 |
| | | | | 709/213 |
| 2006/0031311 | A1* | 2/2006 | Whitney | G06Q 10/107 |
| | | | | 709/206 |
| 2006/0059117 | A1* | 3/2006 | Tolson | G06F 21/604 |

(Continued)

*Primary Examiner* — Farid Homayounmehr
*Assistant Examiner* — Lizbeth Torres-Diaz
(74) *Attorney, Agent, or Firm* — Zagorin Cave LLP; Robert W. Holland

(57) ABSTRACT

Active memory for managing network telemetry information, or other types of information stored as objects, has objects partially-serialized to allow greater amounts of information to store in a memory of a given size with slightly increased retrieval times. Storing additional information in an active memory provides an overall increase in network security platform responsiveness by allowing a greater amount of information to be accessible from the active memory instead of archive.

9 Claims, 7 Drawing Sheets

(56) References Cited

U.S. PATENT DOCUMENTS

| | | | | |
|---|---|---|---|---|
| 2006/0092861 A1* | 5/2006 | Corday | ............... | H04L 41/0213 370/256 |
| 2011/0208849 A1* | 8/2011 | Barnett | ............... | H04L 63/1416 709/223 |
| 2012/0246730 A1* | 9/2012 | Raad | ................... | H04L 61/1511 726/25 |
| 2012/0324480 A1* | 12/2012 | Kalagananam | ....... | G06F 9/4493 719/316 |
| 2013/0117326 A1* | 5/2013 | De Smet | ............... | G06F 9/4488 707/798 |
| 2013/0117405 A1* | 5/2013 | Ebdon | .................... | G06F 9/548 709/213 |
| 2013/0117755 A1* | 5/2013 | Bontempi | ............. | G06F 9/5027 718/103 |

* cited by examiner

AUTOMATED SECURITY ANALYTICS PLATFORM WITH MULTI-LEVEL REPRESENTATION CONVERSION FOR SPACE EFFICIENCY AND INCREMENTAL PERSISTENCE

CROSS REFERENCE TO RELATED APPLICATIONS

U.S. patent application Ser. No. 13/677,121, entitled "Automated Security Analytics Platform," inventor Brian Smith, filed on Nov. 14, 2012now U.S. Pat. No. 9,071,637, issued Jun. 30, 2105, describes exemplary methods and systems and is incorporated by reference in its entirety.

U.S. patent application Ser. No. 13/677,139, entitled "Automated Security Analytics Platform With Pluggable Data Collection And Analysis Modules," inventors Brian Smith and Donovan Kolbly, filed on Nov. 14, 2012, now U.S. Pat. No. 8,973,132, issued Mar. 3, 2015, describes exemplary methods and systems and is incorporated by reference in its entirety.

U.S. patent application Ser. No. 13/677,160, entitled "Automated Security Analytics Platform With Visualization Agnostic Selection Linked Portlets," inventor Andrew Reutter, filed on Nov. 14 2012, now U.S. Pat. No. 8,984,633, Mar. 17, 2015, describes exemplary methods and systems and is incorporated by reference in its entirety.

BACKGROUND OF THE INVENTION

Field of the Invention

The present invention relates in general to the field of information security, and more particularly to an automated security analytics platform.

Description of the Related Art

Information technology has made businesses, government and individuals more efficient. Mobile networking allows end users to interact with work, government and home resources from almost anywhere and at almost any time. To support networking resources, business and government enterprises often employ information technology (IT) specialists who maintain the networking resources and protect the networking resources and enterprise information from unauthorized access. IT specialists employ a variety of tools to maintain network security, such as firewalls, intrusion prevention, anti-virus applications, spam sorting applications, phishing protection applications, identity management, security event management, etc. . . . Unfortunately, conventional network security tools have weaknesses and vulnerabilities that cyber criminals attack and penetrate to access sensitive information.

IT specialists attempt to protect network assets from attacks with conventional network security tools and by monitoring network activity to detect and counteract attacks. For example, IT specialists collect network telemetry information, such as events, flows, logs, user authorizations and authentications. The network telemetry is stored in a database using conventional database servers that communicate with networking resources. The network telemetry is then retrieved and analyzed to identify unauthorized network accesses and access attempts. Often, network telemetry represents a substantial amount of data that the IT specialists sort and process to identify potential security threats. The gathering and analyzing of historical network telemetry to identify security threats enhances conventional security measures, however, the process takes time and all too often provides information about network security threats only after a security breach has occurred.

Cyber criminals have many advantages in their malicious work against IT security measures. Cyber criminals mount multi-stage attacks to pursue financial assets, intellectual property, network telemetry control and government/trade secrets. Rule-based security measures can only react to known threats that implicate a rule. Anomaly detection systems help detect new types of attacks, however, also consume large amounts of data for analysis over lengthy time periods. Thus, anomaly detection systems have a delayed response based upon the inherent performance limitations of relational databases to process network information with various known analytics. Policy-based devices, such as firewalls and identity products, suffer from bit-rot and configuration errors that leave vulnerabilities waiting for an attacker. Cyber criminals working against conventional network security tools have IT specialists outnumbered and outgunned. Cyber criminals patiently tap social media or phishing information with sophisticated tools that enable protracted entry and exfiltration techniques. If IT specialists or enterprise employees make a misstep, leave a door ajar or unknowingly provide a copy of the network house keys, cyber criminals will eventually find access to network resources.

SUMMARY OF THE INVENTION

Therefore a need has arisen for a system and method which provides an automated security analytics platform that protects networking resources from malicious attacks. In accordance with the present invention, a system, method and machine readable medium are provided which substantially reduce the disadvantages and problems associated with previous methods and systems for protecting networking resources from malicious attacks.

A method, system and machine readable medium of one embodiment maintains network security by sensing network telemetry information at plural network resources, communicating the network telemetry information to an active memory, such as DRAM acting as data memory in support of operation of a processor, for use as inputs to network security modules in accordance with input specifications that support logic of a logic specification to provide an output of an output specification for each network security module. Network security is maintained by investigating the network telemetry information with the security modules using network telemetry information stored in active memory and neutralizing threats to the network with security modules in response to detecting predetermined network telemetry information in the active memory. Network security modules activate in response to storage of network telemetry information in predetermined allocated areas of the active memory. A memory allocation module interfaced with the active memory allocates memory areas to network security modules for activation of the network security modules as network resource sensors provide network telemetry information to the active memory. The memory allocation module maintains the active memory to keep network telemetry information up to date by removing older data and allocating memory based upon the usage of network telemetry information.

Another method, system and machine readable medium of one embodiment maintains network security by distributing network security platforms to each of plural networks having a sensor execution environment and analysis execution environment. Network activity is monitored at each network with sensor modules running on the sensor execution environment to store monitored network activity in memory accessible by the analysis execution environment. Network threats are detected with one or more analysis modules running on an analysis execution environment by analyzing stored network information and, in response to detecting, one or more of the analysis modules are distributed to plug into others of the plural network security platforms. For example, analysis modules are distributed as pluggable modules that execute on the analysis execution environments of other network security platforms. In one embodiment, analysis modules bind an executable to become part of a dataflow from a sensor table so that the analysis module activates as a sensor writes network telemetry information to the sensor table that is an input to the analysis module.

Another method, system and machine readable medium of one embodiment manages network information, such as network telemetry information stored in an active memory, by storing the network information as objects, accessing the objects with a security platform, selectively converting less than all of the plural objects into a serialized form in the active memory and accessing at least some of the plural objects from the serialized form in the active memory with the network security platform. Objects in the active memory are incrementally partially-serialized in plural partially-serialized forms to reduce the amount of active memory used in storage of the objects. The partially-serialized forms remain in active memory for rapid retrieval, albeit somewhat slower retrieval than fully-realized objects. A memory allocation module determines how to incrementally perform partial serialization based upon predetermined factors, such as the complexity of an object, the storage time of an object, the frequency of retrieval of an object, and other factors that weigh the cost in memory allocated to store the object versus the cost in increased retrieval time for the object.

Another method, system and machine readable medium of one embodiment presents information for analysis at a display with visualization agnostic selection linked portlet trees. A portlet presents information as visual images at a display with a visualization component, visualization settings and a filter. By interacting through the display with the root portlet, a child portlet is presented having at least the parent filter and at least one unique factor relative to the root portlet, such as a different visualization and/or different filter. A tree of portlets from a root allows an end user to drill down into data with each child portlet having no greater amount of data than that presented by the parent.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Monitoring real-time stateful network telemetry information in an active memory provides real-time network threat neutralization unavailable from conventional network security systems that rely upon database analysis to find network security threats. An active memory used in embodiments of the present disclosure stores network telemetry information as the network telemetry information is provided from network sensors, thus allowing a dataflow engine having plural pluggable network security modules to neutralize security threats as the security threats present in the active memory. The dataflow engine has defined memory and logic resource allocations for pluggable network security modules so that efficient use of memory and processing resources provide an accurate and timely response to network threats in rapidly-deployable modules.

Pluggable modules provide investigative, collaborative and threat neutralization functions based upon network telemetry information stored in an active memory. Sensor modules monitor network activity by interfacing with network sensors and storing monitored network activity in active memory accessible by analysis modules. Sensor modules selectively gather network telemetry information to allocated areas of active memory where network security modules analyze the network telemetry information and take action to neutralize detected network threats. Sensed network telemetry information includes large quantities of a wide variety of activity sensed by network resources. The sensed network telemetry information is arranged, sorted and filtered with visualization-agnostic selection-linked portlets that rapidly present plural visualizations of rows, columns, graphs, aggregations, parallel coordinates or other desired views that isolate outlier activity typically associated with malicious attacks. The active memory provides analysis modules with live network telemetry information directly from collection by network resource sensors rather than stale information stored and then retrieved from a database. The active memory network information includes state information that is often lost with archived and retrieved information, such as state information associated with protocols and connections, so that pluggable analysis modules correlate virtually any number of incident parameters imaginable in real time. As a network security platform dataflow engine detects and reacts to threats, pluggable network security modules used to detect and respond to threats are collaboratively shared with other network security platforms to respond to similar threats in other networks.

Figure 1:
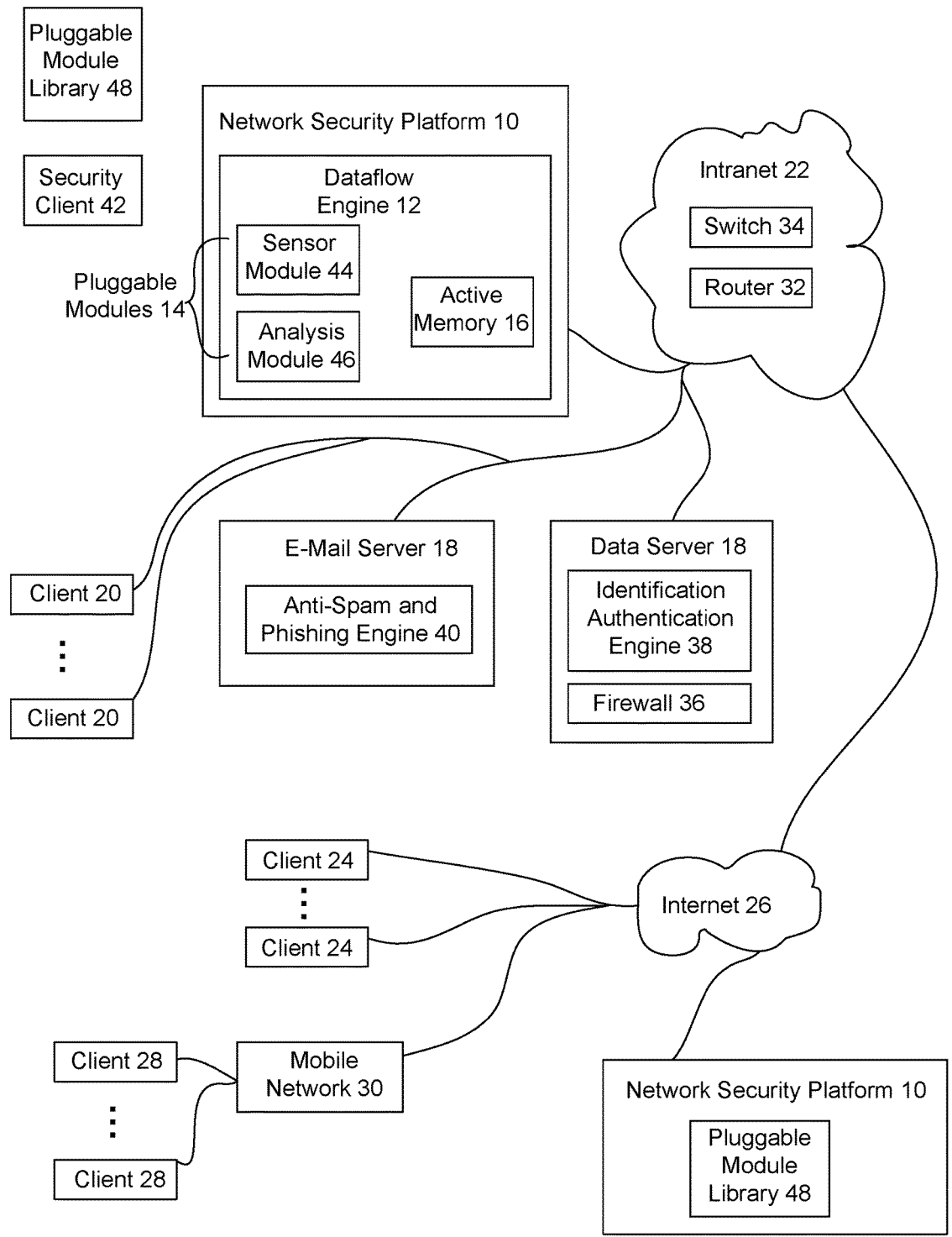
FIG. 1 depicts a block diagram of network resources protected by network security platforms having a dataflow engine that uses pluggable network security modules interfaced with an active memory to identify and neutralize threats.

Referring now to FIG. 1, a block diagram depicts network resources protected by network security platforms 10 having a dataflow engine 12 that uses pluggable network security modules 14 interfaced with an active memory 16 to identify and neutralize threats. The network resources monitored and/or protected by network security platform 10 include a wide variety of physical devices that communicate, process, store and use information, such as servers 18 that support clients 20 local to an intranet 22, clients 24 remotely interfaced with intranet 22 through Internet 26, and mobile clients 28 remotely interfaced through a mobile network 30. Some network resources are deployed within Internet 26 to aid in communication of information, such as routers 32 and switches 34. Network resources include conventional network security devices, such as firewalls 36 that restrict access to servers 18 or clients 20, identification authenticators 38 that restrict access to information based upon an end user identifier authorization, and anti-phishing and anti-spam applications 40 that filter out e-mail messages having indications of a malicious source.

Dataflow engine 12 executes over a network security platform 10 under the management of a security client 42. For example, network security platform 10 is a server interfaced with intranet 22 to communicate information with network resources using TCP/IP and other protocols. Network security platform 10 has one or more processors that execute instructions stored in non-persistent memory, such as dynamic random access memory, and persistent memory, such hard disk drives and solid state drives. Dataflow engine 12 provides one or more execution environments that support execution of network security modules, such as sensor modules 44 that collect network telemetry information sensed at various network resources and store the network telemetry information in active memory 16 and analysis modules 46 that analyze network telemetry information stored in active memory 16. In one embodiment, dataflow engine 12 is a Python-based object-oriented environment that pushes native code of network security modules into an execution path of program memory for rapid access to network telemetry information as it arrives in active memory 16. In one embodiment, active memory 16 is dynamic random access memory (DRAM) directly accessible by the processor(s) running sensor modules 44 and analysis modules 46. Active memory 16 stores data memory of the dataflow engine 12 execution environment without archiving sensed network telemetry information to a database format. Security client 42 is, for example, a client computer interfaced with network security platform 10 through a web browser that presents network telemetry information to an information technology specialist for detection and neutralization of network security threats. As network security threats are identified and neutralized by a network security platform 10, pluggable modules 14 for detecting and responding to the network security threats are stored in a pluggable module library 48 for transfer and use at other network security platforms that face the same or similar threats.

Figure 2:
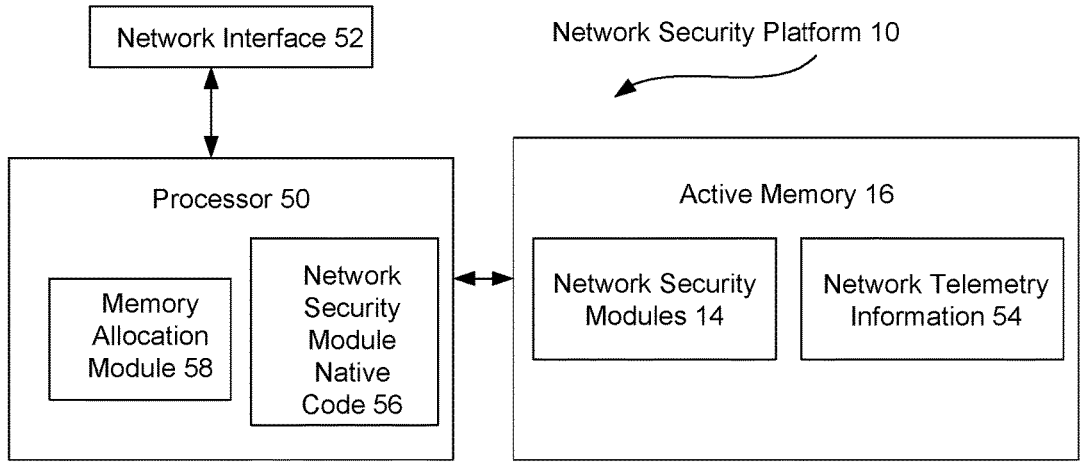
FIG. 2 depicts a block diagram of a network security platform having a processor and active memory to run network security modules for monitoring network resources and neutralizing network threats.

Referring now to FIG. 2, a block diagram depicts a network security platform 10 having a processor 50 and active memory 16 to run network security modules 14 for monitoring network resources and neutralizing network threats. Processor 50 interfaces with a network interface 52 to retrieve network telemetry information 54 sensed at network resources and store the network telemetry information 54 in active memory 16. For example, network security modules 14 in active memory 16 include a sensor module that has native code 56 executing in program memory of processor 50 to retrieve sensor information from network resources and to store the sensor information in allocated portions of active memory 16 as network telemetry information 54. A memory allocation module 58 executing from program memory of processor 50 associates each network security module 14 with an allocated area of network telemetry information 54 stored in active memory 16. As network telemetry information 54 is stored in an area allocated to a network security module 14, memory allocation module 58 activates the associated network security module 14 to process the information, such as by activating native code 56 of the associated network security module 14 to process the network telemetry information 54. Thus, as network telemetry information 54 is updated, functions associated with predetermined portions of the network telemetry information are activated, performed and then returned to an inactive state for real-time responses. For example, memory allocation module 58 uses a publish and subscribe method to link network security module outputs to the inputs of other network security modules. Memory allocation module 58 manages active memory 16 to maintain the most relevant network telemetry information 54 in active memory 16 without exceeding storage resources. For example, active memory 16 is DRAM that memory allocation module 58 divides into allocated areas based upon memory allocations made for each network security module 14. As an allocated area becomes full, memory allocation module 58 discards older and/or less relevant network telemetry information to a database for archiving. Memory allocation module 58 tracks the usage of network telemetry information 54 to re-allocate storage resources so that more relevant information has a greater storage life within active memory 16.

Figure 3:
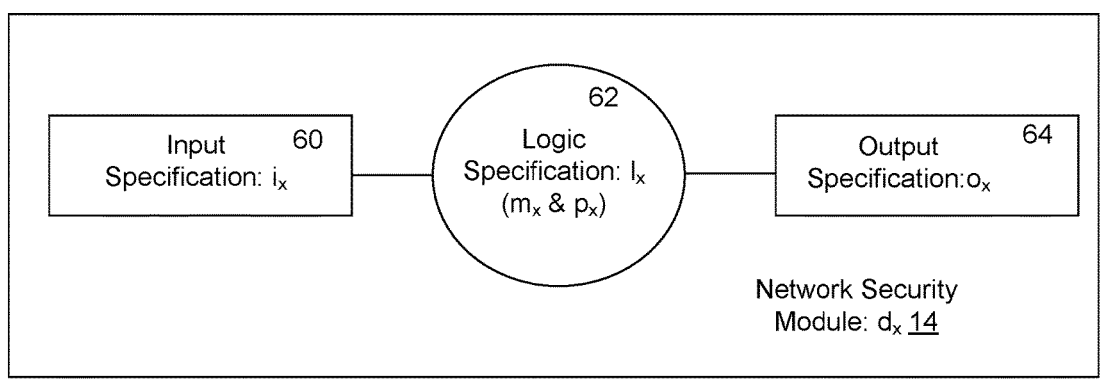
FIG. 3 depicts a block diagram of a network security module having an input specification, logic specification and output specification.

Referring now to FIG. 3, a block diagram depicts a network security module 14 having an input specification 60, logic specification 62 and output specification 64. For example, network security modules 14 are objects defined to execute in a Python execution environment. In the example embodiment depicted by FIG. 3, the security module d has an input specification 60 defining information stored in active memory 16 used as inputs for a network security function provided by logic specification 62. Logic specification 62 performs functions on the inputs using predetermined allocations of memory m and processing resources p to generate an output defined by output specification 64. Output specification 64 stores output in predetermined allocated areas of active memory 16 that may in turn provide an input to another network security module 14. In one embodiment, memory allocation module 58 dynamically optimizes network security platform 10 requirements by including in active memory 16 only network telemetry sources of information required by the aggregation of all network security module 14 input specifications 60. For example, network telemetry information from sources that do not fall within the aggregate of input specifications 60 for a network security platform 10 are discarded from active memory 16 to an archive of persistent memory, such as a database. Network security modules 14 are automatically linked together by the input and output specifications to create an efficient data flow dependence graph. In one embodiment, network security platform 10 processing and memory resources are optimized by only storing network telemetry information required by network security modules 14 in use at the network security platform 10 and by processing logic only when new input information associated with a security module 14 in use arrives at network security platform 10. By optimizing the selection of information sources, the memory requirements and the processing cycles of each dynamically linked network security module 14, greater numbers of network security modules 14 can run on a given set of memory and processor resources. Memory allocation module 58 applies the input specification 62 and the memory and processing allocations of the logic specification to allocate active memory in association with network security modules 14. Memory allocations are adapted by memory allocation module 58 to store network telemetry information optimized in accordance with historically measured usage. Memory allocation module 58 further optimizes memory utilization by assigning a time frame for maintaining network telemetry information in active memory 16 so that information is removed from active memory 16 as the information exceeds a predetermined aging period. In addition to aging, memory pressure is considered. Memory aging primarily determines what information to remove while memory consumption primarily determines when to remove the information.

Figure 4:
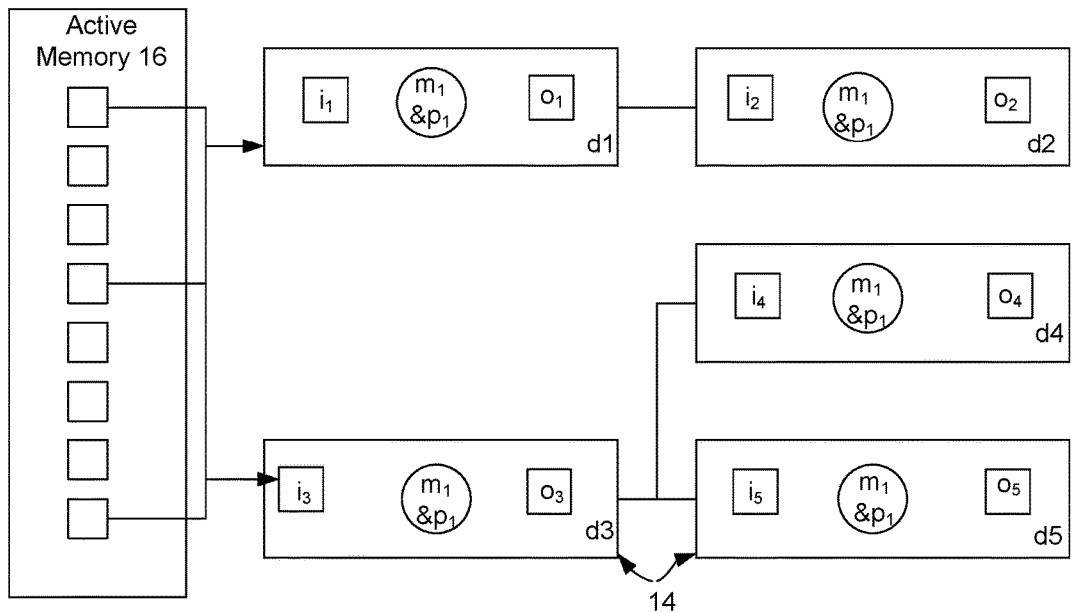
FIG. 4 depicts a block diagram of dynamic linking between security modules by linking output to input specifications.

Referring now to FIG. 4, a block diagram depicts dynamic linking between security modules 14 by linking output to input specifications. Tables in active memory 16 store outputs of security modules 14 with a publish and subscribe method to link the output of selected modules to the input of selected modules. Linking security module outputs to inputs efficiently activates a downstream security module only when a relevant output of an upstream security module is presented as a new input. In this manner, network security modules 14 that perform analysis or threat neutralization functions remain inactive until a sensor module outputs a sensed network telemetry value that maps to an input of the analysis or neutralization module. The publish and subscribe method passes the output value of the sensor module to subscribed analysis and neutralization modules so that analysis and neutralization functions are activated only when relevant inputs are sensed by network security platform. In one alternative embodiment, security modules are executed by multiple platforms or multiple CPUs that use a shared memory architecture to provide data access to each platform or CPU. Alternatively, a non-shared memory architecture may be used for some security modules, such as based upon the platform or CPU that executes the security modules. For example, in a non-shared memory architecture, messages communicate information between security modules, such as with network messaging. As an example, multiple platforms might each support one or more security modules with a shared memory on the platform while the security modules communicate between platforms using a non-shared memory architecture, such as network messaging.

In the example embodiment depicted by FIG. 4, five network security modules 14 have dynamically constructed links that selectively activate downstream network security modules d2, d4 and d5 when outputs are made by d1 and d3. Network security modules d1 and d3 receive inputs from a subset of external input sources stored in allocated areas of active memory 16. Network security module d2 has an input from d1 and modules d4 and d5 have an input from module d3. Generally, network security platform 10 is a system S of n security modules d(1) through d(n) that optimizes data flow by selecting only the subset of all network telemetry information data sources needed for the system S to operate. In the example embodiment depicted by FIG. 4, the optimized data flow is the intersection of the inputs of all externally-facing inputs, which equals the inputs i(1) to security module d(1) plus the inputs i(3) to security module d(3). Active memory 16 need only store these optimized inputs to support a network security platform dataflow engine having network security modules d(1-5), while the total memory allocated to the dataflow engine is the sum of the memory of each logic specification 62 for each of the network security modules d(1-5). Each network security module 14 can have very specific memory allocations so that new network security modules 14 can be added to the dataflow engine incrementally without having to allocate large or arbitrary amounts of memory to the entire system. In an example optimized network security platform 10, only data needed or used by one or more security modules 14 are ever stored in active memory 16 to optimize the use of memory and allow the network security platform 10 to operate at high speed with direct access to information stored in DRAM instead of relying upon hard disk drive storage or archive database information. Further, limiting data saved to only that called for by the sum of inputs of network security modules 14 increases the number of network security modules that can run on a given allocation of memory. Processing efficiency is achieved since a network security module's logic processing is activated only when relevant input changes occur at active memory 16 that are specific to a network security module so that minimal processing is performed based upon new data events.

Figure 5:
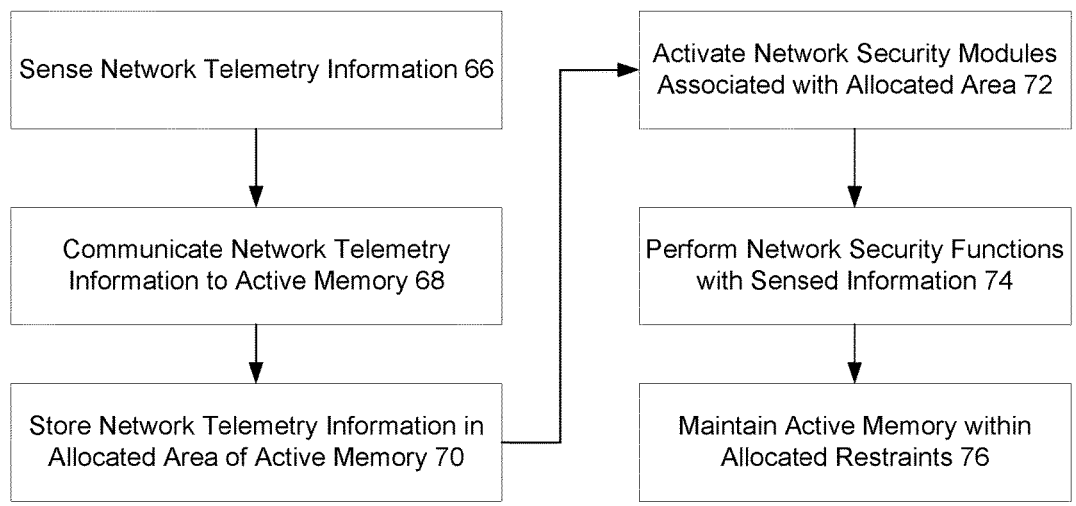
FIG. 5 depicts a flow diagram of a method for performing a dataflow engine at a network security platform to maintain security of a network.

Referring now to FIG. 5, a flow diagram depicts a method for performing a dataflow engine at a network security platform to maintain security of a network. At step 66, network telemetry information is sensed by sensors associated with network resource devices, such as servers, firewalls, authentication services, routers, etc. . . . At step 68, the network telemetry information is communicated to an active memory of a network security platform. In one example embodiment, sensor modules of the network security platform receive the network telemetry information and selectively store only the portions of the network telemetry information that fall within the sum of external inputs of network security modules running on the network security platform. As an example, network telemetry information is selectively pushed from sensors to a predetermined active memory location with an agent associated with the sensor. As an alternative example, network telemetry information is selectively pulled to an active memory location with an agent associated with the active memory platform, such as an agent running on a server. At step 70, the network telemetry information is stored in allocated areas of active memory by the sensor modules. At step 72, a new data event for an allocated area of the active memory activates network security modules associated with the allocated area, such as by a publish and subscribe method linking new data to network security module(s) that use the new data in their input specification. At step 74, the activated network security modules perform analysis and threat neutralization functions on the sensed information by executing logic to use the inputs. At step 76, the active memory is maintained within allocated restraints by selectively pruning information from allocated areas based on data aging, data usage, data size or other constraints.

Figure 6:
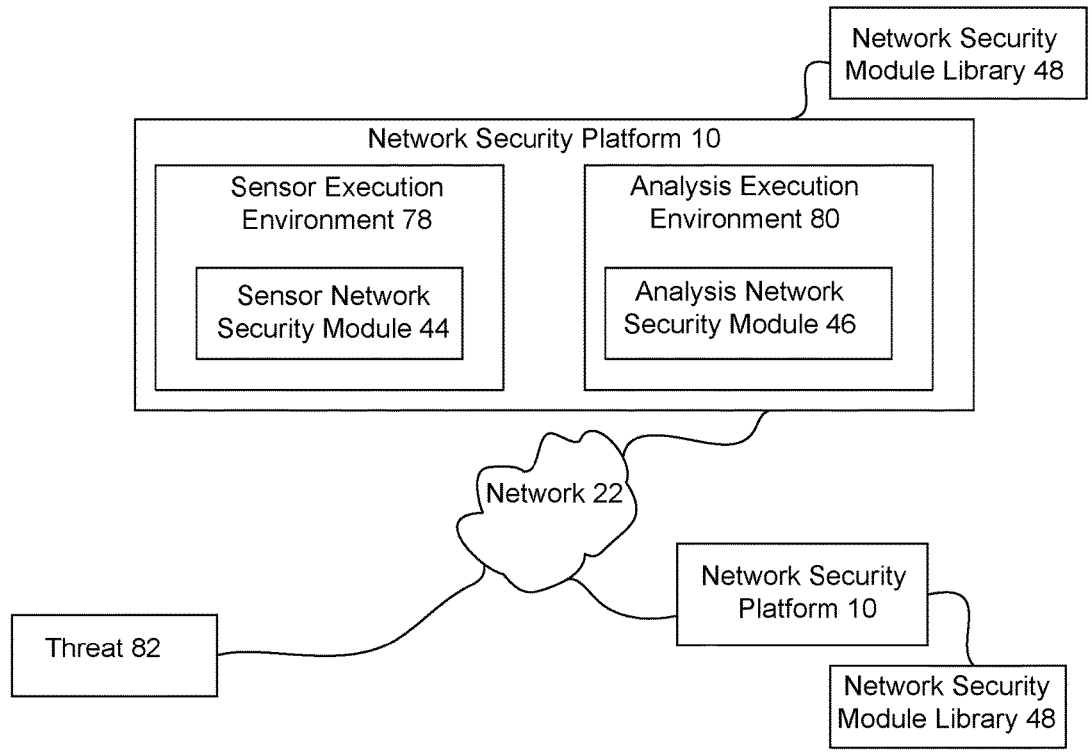
FIG. 6 depicts a block diagram of plural network security platforms deployed at plural networks, each network security platform having pluggable network security modules.

Referring now to FIG. 6, a block diagram depicts plural network security platforms 10 deployed at plural networks 22, each network security platform having pluggable network security modules 14. Pluggable network security modules 14 offer rapid collaborative distribution of protective measures between plural networks 22 when network threats are discovered at one network that have the potential to spread to other networks. Pluggable functionality is provided by making network security modules 14 separately installable and distributable units of software from the base network security platform 10. Network security platform 10 is built with plural execution environments adapted to execute pluggable network security modules 14, such as object-oriented Python execution environments. In the example embodiment depicted by FIG. 6, a sensor execution environment 78 runs pluggable sensor network security modules 44 that perform data mining functions by collecting selected of sensed network telemetry information defined by input specifications of network security modules running on network security platform 10. In order to make more rapid data transfers, serialized or partially serialized data having a reduced memory footprint as set forth below may be used to transfer network telemetry information instead of transferring a fully-realized object form. In one example embodiment, a fully realized object is translated to the compact or semi-compact form of data in order to effectuate data transfers in a more rapid manner. Additionally, an analysis execution environment 80 runs pluggable analysis network security modules 46 that have logic to perform network security functions with the network telemetry information. A dataflow engine is formed within a network security platform by relating one or more execution environments to each other. In one alternative embodiment, a network security platform 10 may support plural data flow engines 12, each dataflow engine 12 having plural dynamically linked pluggable modules 14. An application programming interface defines communications between the execution environment and pluggable modules so that pluggable modules adapt collaboratively to network security platforms 10 as needed. For example, the execution environment exposes a Python language interface so that pluggable network security modules 14 interface to the execution environment by defined Python subclasses and calls into the execution environment via inherited methods. Although FIG. 6 presents an example embodiment with sensor and analysis execution environments, in alternative embodiments alternative execution environments and modules may be used, such as a separate execution environment and modules for neutralizing network threats by locking down network resources. In one alternative embodiment, pluggable modules 14 also interface with execution environments with standard and portable JSON representations that define specifications for the pluggable modules and other components, such as tables created or used by the modules.

Figure 7:
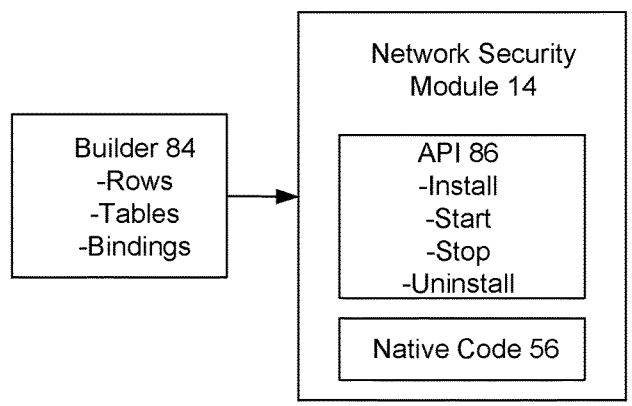
FIG. 7 depicts a block diagram of one example embodiment of a pluggable module builder for creating network security modules that will plug into a network security platform execution environment.

Referring now to FIG. 7, a block diagram depicts one example embodiment of a pluggable module builder 84 for creating network security modules 14 that will plug into a network security platform 10 execution environment. Builder 84 is an instance of a Python class that builds network security module objects with executable code by exposing building blocks to a network administrator for creating a network security module 14. For example, fundamental objects exposed to a network security module author include rows, tables and bindings that are collected with associated code in an identifiable unit of functionality as a network security module 14. The rows are structured records mapping names to values and conforming to a schema. The tables are a collection of rows indexed in user-definable ways that share a schema. Tables are named objects in the network security platform. Bindings are definitions of handlers associated with tables for particular events, a type of object that embodies a connection between an event on a table and an entry point into executable code. Defined events include rowcreate, which is addition of a row to a table, rowupdate, which is updating of a row in a table, and rowdelete, which is removal of a row from a table. Network security modules 14 built by builder 84 have an application programming interface 86 that interfaces the network security module with an execution environment. For example, application programming interface 86 sets commands to interact with an execution environment for installing an object to persistent memory, starting native code of the object to program memory by pushing it into the execution path, stopping from program memory and uninstalling the network security module 14 at the execution environment.

Figure 8:
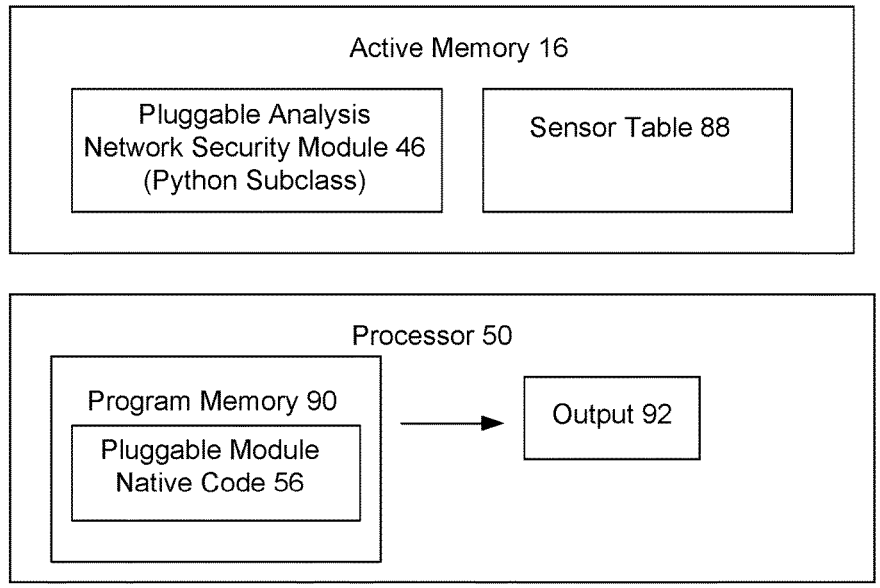
FIG. 8 depicts a block diagram of one embodiment of a pluggable analysis network security module executing at a processor.

Referring now to FIG. 8, a block diagram depicts one embodiment of a pluggable analysis network security module 46 executing at a processor 50. In operation, as network telemetry information is retrieved from sensors by sensor modules 44, sensor modules 44 store the network telemetry information that are inputs of the sum of input specifications for the analysis modules 46 in active memory 16 so that analysis modules 46 have relevant network telemetry information in real-time. In one embodiment, the only network telemetry information that is stored in active memory is the network telemetry information that falls within the sum of analysis module input specifications. Sensor modules 44 store the relevant network telemetry information in the active memory to be accessible by the analysis execution environment 80. For example, the sensor execution environment 78 arranges for relevant network telemetry information from sensor modules 44 to appear in a sensor table 88 of the analysis execution environment 80 so that analysis modules 46 can bind to sensor table 88 for rowcreate events and therefore be invoked when new network telemetry information arrives from a sensor. In one embodiment, sensor modules are organized as Unix subprocesses that emit to stdout newline-delimited JSON records with one line and hence one record per event detected by the sensor module. The subprocess protocol also includes stderr which send a plain text when the sensor has an error or a line comprised of a JSON structure. The non-error JSON structure messages include a structured message, which can include severity information, a statistics message, which monitors performance and event processing by a sensor, or a status message, which monitors the sensor has a whole and components of the sensor.

As an example, an analysis module 46 stored in active memory 16 as a Python subclass module has native code 56 pushed into the program memory 90 of processor 50. When a sensor module 44 stores new network telemetry information to sensor table 88 with a rowcreate, a binding of analysis module 46 to the rowcreate invokes analysis module 46 to retrieve the new network telemetry information and perform logic of the logic specification. As part of the logic, analysis module 46 can construct its own tables, such as append only log tables or correlation tables that map keys to rows, to represent an output 92 of the analysis to which other analysis modules can bind for performing higher order analysis. Output 92 can, for example, include a rowcreate, rowupdate or rowdelete to a table in active memory having a publish and subscribe relationship to another analysis module 46. One example of related pluggable modules 14 that detect, analyze and neutralize network security threats is the comparing of authentication information with a network resource use to detect unauthorized network access attempts. A sensor module 44 detects a VPN access by a user with authentication information and stores the event to active memory 16 sensor table 88 as an input to an analysis module 46 that monitors VPN accesses. The VPN access analysis module 46 binds to the sensor table rowcreate to retrieve the authentication information and performs logic to check for an unauthorized access attempt, such as a retrieval of the most recent building magnetic card access by the end user. The VPN access analysis module generates an output 92 by a rowupdate to a lockdown table in active memory 16 if the VPN access attempt occurs from a remote location while the end user is in an enterprise building. A lockdown analysis module 46 binds to the rowupdate to retrieve the end user's identifier and applies the end user's identifier to perform a rowdelete of the end user from a VPN access table, effectively locking out the end user from VPN access. Thus, monitoring, analysis and neutralization is performed in real time from active memory with the same set of common information and without delay introduced by archiving and then analyzing the network telemetry information.

Figure 9:
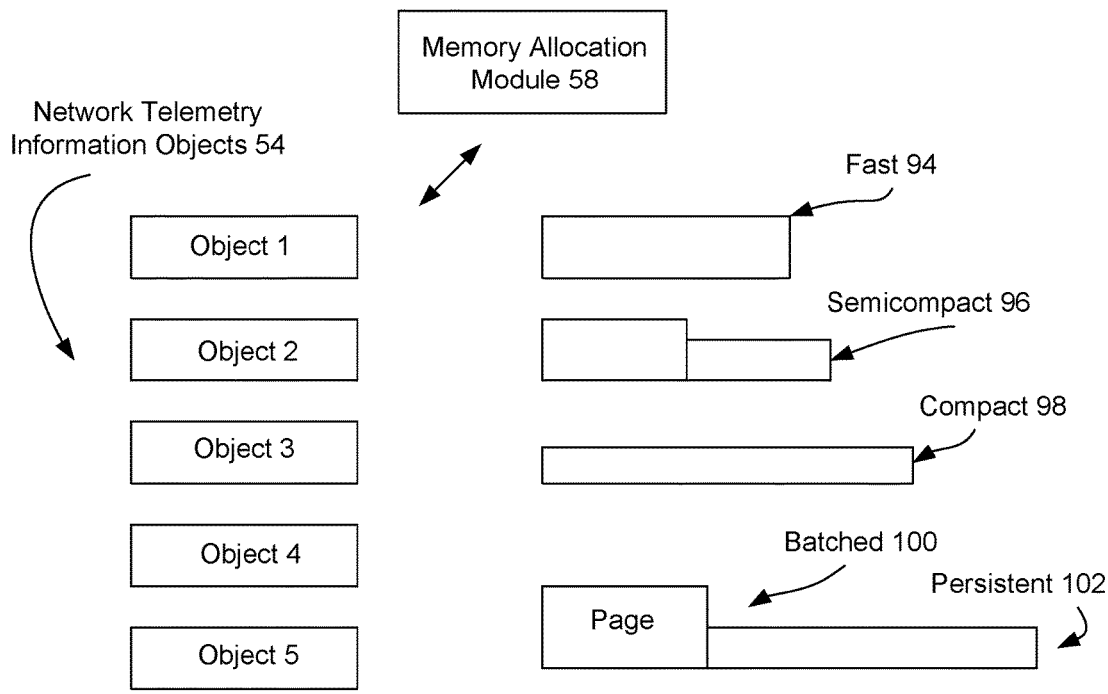
FIG. 9 depicts a block diagram of one example embodiment of active memory 16 depicted as random access memory (RAM) that provides rapid access to network telemetry information objects.

Referring now to FIG. 9, a block diagram of one example embodiment of active memory 16 is depicted as random access memory (RAM) that provides rapid access to network telemetry information objects 54. Generally, RAM provides greater speed of access to stored information, however, RAM is more expensive than offline storage, such as hard disk drives. In order to store large quantities of information with less expense, information stored as objects in RAM is serialized to a disk representation for storage on a hard disk drive. The serialized information is restored to object form from the serialized hard disk drive storage when retrieved from the hard disk drive storage for use by processing objects, however, the transformation and movement of the information introduces delays in the processing. Maintaining all relevant network telemetry information in one contiguous active memory of RAM to which the processor(s) have direct access provides real-time network monitoring, analysis and threat response based upon the same common set of network telemetry information. Serializing network telemetry objects for storage in an off-line memory separate from the active memory introduces delays in processing that make real-time response to threats difficult where large quantities of network telemetry information are available.

FIG. 9 depicts a representation conversion within active memory 16 that gradually breaks down the object serialization process for increasing storage space within active memory 16 without actually transferring partially-serialized network telemetry information 54 to off-line storage. One advantage of partial-serialization is that representations of network telemetry information become more memory-efficient within active memory 16 with a slightly-more expensive use of partially-serialized information due to slightly increased retrieval times. The effect of partial serialization within an active memory 16 is to increase the amount of information stored in active memory 16 with a slower retrieval of information, thus providing an overall more rapid retrieval for a greater amount of information in a given memory size. Another advantage of partial-serialization is that varying degrees of partial-serialization are performed incrementally and asynchronously to avoid expensive "stop and write" steps associated with system writes to off-line memory.

Network security platform 10 stores large numbers of objects, such as AVLs or rows, in active memory 16 that is directly accessible to a processor supporting execution environments so that a rapid response is possible to changes in network telemetry information as the changes are sensed. In one embodiment, active memory 16 is entirely made up of DRAM that is interfaced with a processor to provide data memory for supporting processor operations. In alternative embodiments, active memory may instead be a contiguous block of other types of memory that provide data memory directly interfaced with a processor. A large storage capacity for active memory 16 provides depth of network telemetry information over time and minimizes access time for network security modules. Memory allocation module 58 allocates various amounts of active memory 16 to different network security modules based upon desired response priorities. Memory allocation module 58 also provides a fast-restart capability for network security platform 10 by taking "snapshots" of the state of memory for use in a restart if needed. Memory allocation module 58 also archives older objects to off-line storage as needed to manage the availability of active memory 16 for new network telemetry information.

In order to balance rapid response, memory size and memory availability, memory allocation module 58 defines multi-level representations of objects with different space and performance tradeoffs. The lower level slower representations minimize their impedance mismatch with the requirements of off-line hard disk drive storage. In the example embodiment depicted by FIG. 9, memory allocation module 58 defines multi-level representations by separating out the serialization process from the persistence process to achieve more efficient in-memory representations at active memory 16 with partial serialization performed over time followed at a later time by persistence to off-line storage.

A fast representation 94 of network telemetry information provides the most rapid access and the greatest memory cost. Fast representation 94 stores network telemetry information with attribute values of fully-realized Python objects. Essentially, in fast representation 94, memory overhead for rapid use of network telemetry information is maintained in fully-realized object form, such as header data used to support pointers that allow rapid retrieval. A semicompact representation 96 maintains complex attribute values, such as dictionary sets, as fully-realized Python objects while storing simpler objects in serialized form to reduce per-object overhead, such as for IP, integer and time objects. A compact representation 98 fully serializes one or more network telemetry information objects as a separate object with shared "context" used to interpret the serialized representation, such as a string table for interned strings. A batched representation 100 assembles together compacted objects and compresses the assembled compacted objects into a page. A persistent representation 102 prepares the batched representation for persistent storage by keying compressed batched strings to page numbers. Memory allocation module 58 performs transitions between the representations incrementally based upon the amount of active memory that is available, the amount of information stored and the relative importance for each network telemetry information object of a rapid retrieval. To minimize the immediate cost of a snapshot, objects are incrementally pushed down the hierarchy as a scheduled snapshot approaches so that fewer objects remain in fast or compact representations.

Memory allocation module 58 selects a representation for an object based in part upon the increased time for retrieval of the object as partial serialization progresses. In the case of batched representation 100, objects saved with a batched representation are essentially immutable so that the object has to be extracted in order to be modified, which adds to retrieval time. Compact representations 98 that include Python strings may also be immutable. Memory allocation module 58 will default to a fast or semicompact representation so that most accesses and modifications will be done to mutable objects, however, immutable objects provide a representation that allows more efficient memory use while retaining relatively rapid retrieval of network telemetry information that is less frequently used relative to retrieval times of off-line storage. Where a batched representation is stored to a memory mapped file, writing of the batched file to disk is asynchronous so that objects in the batched representation may be preemptively stored to disk storage for archiving if extra processing cycles are available even while the batched representation remains available in active storage. Other factors considered in the selection of a representation for a particular object include the complexity of attribute values, the frequency of access to the object, the length of time of storage in active memory, and the timing of snapshots for rapid system restarts. Generally, memory allocation module 58 balances system response time with memory cost by tending to keep more complex and frequently accessed objects as fully-realized objects while partially-serializing less complex and less frequently accessed objects, although other types of priorities may be applied as desired.

Memory allocation module 58 manages memory use in part by discarding network telemetry information from active memory in time to make sure that room exists for the storage of newly sensed network telemetry information. In one embodiment, discarding information from active memory is performed on a page level by deleting the oldest page and removing or marking as deleted any objects that still point to the oldest page from the object index. In one embodiment, the age for determining deletion is based upon modification time of the object, and in another embodiment age is based upon access time to the object. Where modification time is used, page numbers are assigned in sequential order and then the lowest numbered page is the oldest. Where access time is used, each page stores its most recent access time and then pages are deleted explicitly in age order. In another alternative embodiment, storage volumes are created and deleted just as needed to maintain storage space in the active memory. This provides a log-structured storage that provides "time travel" by very quickly restoring the state of the network security platform to a pre-existing state at a previous time point. Alternatively, to preserve processing cycles, rather than saving network telemetry information to an archive after it becomes outdated, old data is simply deleted and an archive is created off-line by a parallel storage system interfaced with network sensors.

Figure 10:
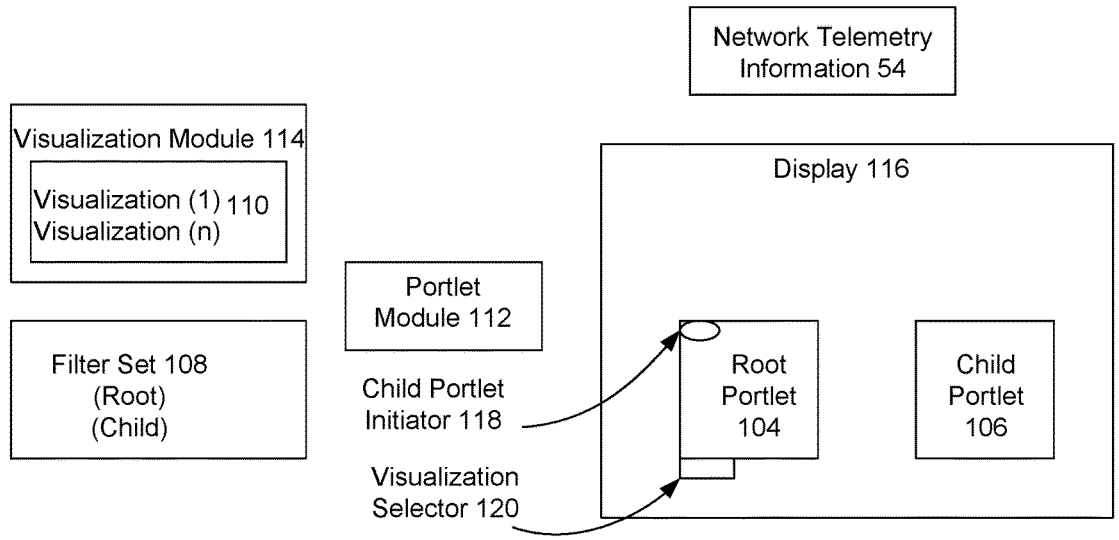
FIG. 10 depicts a block diagram of a system for presentation of network telemetry information with plural visualizations in selection linked portlet trees.

Referring now to FIG. 10, a block diagram depicts a system for presentation of network telemetry information with plural visualizations in selection linked portlet trees. Linked portlets provide a presentation of network telemetry information to describe parent and child relationships amongst an arbitrary number of portlet visualizations, each with its own visualization settings. An end user viewing linked portlets can quickly switch visualizations of selected network telemetry information to analyze network activity in real time as network resource sensors update network telemetry information in active memory. Each root portlet 104 constrains information presented in its child portlets 106 via a selection mechanism to provide a drilldown analysis system in which each child portlet 106 displays a smaller data set or different visualization than its parent. Portlets provide a tool for visualizing relationships across different values from different portions of data, such as separate data sources. As an example, defining labels and operators for a portlet creates virtual columns of data with features that dynamically modify data models to graph visualizations and the results of analytics. An example of a relationship discoverable from network telemetry data presented in portlets is the impact of a virus on network assets. For instance, a machine virus alert sets off an analysis of operating conditions at the machine to show an increase in machine CPU cycles around the time of the virus infection. By applying a visualization of machine operating conditions and virus alerts to detect the impact of a virus, the label and operators for the visualization may be captured and applied to other network telemetry data to identify virus infections where an alert did not issue.

Portlets 104 and 106 are each a display element that includes a reference to a data source, such as network telemetry information 54, a filter set 108 and a visualization 110. Portlet module 112 responds to a request for a root portlet presentation by obtaining from an end user the desired filter set 108 and visualization 110 and retrieving the visualization method for visualization 110 from visualization module 114. Portlet module 112 generates a root portlet 104 by mediating between the data source 54, filter set 108 and visualization 110 to display information at a display 116 with visualization settings applied to the method of visualization 110. Once a root portlet 104 is presented at display 116, an end user can modify its filter 108 and visualization 110 to adjust the presentation or can generate one or more linked child portlets 106 with modifications to the filter 108 and visualization 110 relative to root portlet 104. Although referred to as a root portlet generated by application of a parent filter to root information, the root is also considered a parent portlet with a parent filter applied to parent information. Through the parent, child and sibling relationships, a parent relative to other children which is also a child or sibling may be dynamically defined as a root that begins a new tree for a desired visualization.

In one example embodiment, portlet module 112 is a pluggable module 14 running on a network security platform 10 that links via tables to pluggable modules 14 and other portlet modules 112 to present parent and child portlets 104 and 106 at a security client 42 having a display 116. Visualization module 114 has plural visualizations 110 for selection by portlet module 112. Each visualization 110 includes a method for displaying a data set based upon specified settings, such as rows, columns, graphs, aggregations, parallel coordinates or other desired views that isolate outlier activity typically associated with malicious attacks against network security. For example, a bar chart visualization presents a bar chart based upon visualization settings that specify the field by which to aggregate the data. As another example, a data grid visualization presents data groups in an order of fields specified by a user in associated visualization settings. In one example embodiment, network telemetry information 54 provides a data source which declares a field set and provides a mechanism for converting related filter sets into related data sets. A filter set is a set of zero or more comparison operators relative to a particular field set, which is applied to constrain the amount of data in data sets relating to the same field set. Data sets displayed by a portlet are a set of rows relative to a particular field set with each row providing a value, known as field values, for every field in the field set. Field sets are a set of one more fields, each declaring a name, such as a ranking, and optionally including a type, such as integer data.

Visualization module 114 provides visualizations 110 so that the architecture of selection-linked portlets is independent of the specific visualization in use. Presenting a portlet with a visualization is performed with a visualization component by declaring settings relevant to the visualization and selectable by an end user, by providing a method to generate a display presentation with the visualization settings, and by defining a filter set to determine the information included in the portlet presentation. The portlet presentation includes an interaction with the end user to allow selection of data for presentation. In the case of a child portlet, the end user selects a subset of the root data set found in the root portlet for presentation in the child portlet. In response to selection of the child portlet and subset of data, a method of the child visualization 110 retrieves a filter set 108 that, when applied to the root data set results in presentation of the subdata set desired by the end user in the child portlet 106. For example, when an end user selects a child portlet initiator 118, a selection filter set of the child portlet visualization 110 is applied to the root data set to select the desired data subset for presentation in the child portlet initiated by child portlet initiator 118. In one example embodiment, a bar chart visualization that aggregates data as bars applies a selection filter set at the selection of a bar to initiate a child portlet 106 for including comparison operators that fill out all data not represented by the selected bar. A visualization selector 120 at each portlet 104 and 106 exposes a mechanism for an end user to quickly select a different visualization 110 for presenting information in the portlet, such as by switching between a bar graph and a data value presentation. Settings for visualizations 110 are persisted so that the settings are re-applied if the user switches back to a previously-selected visualization.

In order to perform analysis of network telemetry information, an information technology specialist defines selection-linked portlet trees that visualize network threats, such as outlier activity at the network often associated with malicious attacks or unauthorized activity. A selection-linked portlet tree is a set of one or more portlets arranged into a tree such that each portlet has zero or more children, and each portlet except the root portlet 104 has a parent. Root portlet 104 represents the top of the tree and has no parent. A portlet's ancestors include the parents up the tree to the root portlet. A portlet's descendants include the children of the portlet to the end of the tree. An information technology specialist reviewing network telemetry information 54 in active memory selects relevant portions of the network telemetry information to view by selecting a filter set and visualization. Network threats are isolated, typically as outlier information, by drilling down into a data set with children portlets in conjunction with the filter sets and selections filter sets of ancestors for the relevant data source. Each portlet displays a data set that is at most the same size as its parent's data set but typically smaller than the parent data set as a result of applying the parent's selection filter set in addition to the child's own inherent filter set.

Figure 11:
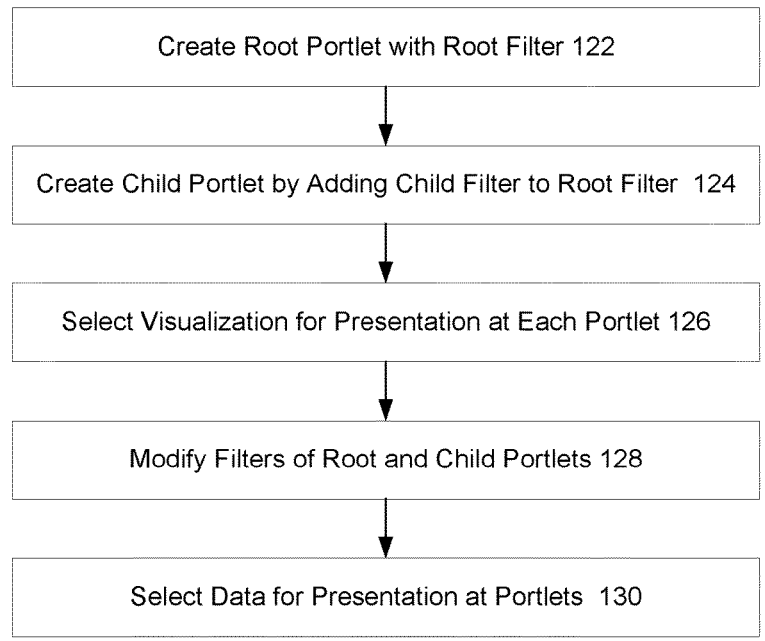
FIG. 11 depicts a flow diagram of a process for drilling down into network telemetry information to evaluate network threats by creating a portlet tree and defining relationships between portlets of the tree.

Referring now to FIG. 11, a flow diagram depicts a process for drilling down into network telemetry information to evaluate network threats by creating a portlet tree and defining relationships between portlets of the tree. The process starts at step 122 by creating a root portlet with selection of a data source, a visualization 110, and visualization settings. As an example, the data set might consist of sensor data for network resources of a storage facility, such as authentication and access requests to data stored in a storage area network. In the example embodiment, the root portlet presents a bar graph that aggregates objects in the network telemetry information that result from sensors associated with the storage area network. The root portlet includes one or more child portlet initiators 118 to create child portlets. At step 124, a child portlet is created from the root portlet to help identify potential threats. The child portlet varies presentation of information by further filtering the information with an additional filter set or presenting the information with a different visualization than the root portlet. In the example embodiment, the storage area network information is further filtered to isolate failed authentication attempts or viewed with a line graph visualization of network addresses that make failed authentication attempts. At step 126 visualizations at the parent or child portlets are switched to provide different views of the information that highlight potential network security threats. At step 128, the filter set for presenting information in the root or child portlets is modified by editing the selected portlet's filter set. Editing a filter set refreshes the portlet's data set and therefore its visualization as well as the data set and visualizations of descendant portlets that have their filter sets reset to adapt to the parent's new filter set. At step 130, data for a root or child portlet is selected to provide a different visualization. For instance, one or more elements within a portlet's visualization is selected to isolate information of interest, which refreshes the portlet's selection filter to update the data set presented by the portlet and any descendent portlets.

Figure 12:
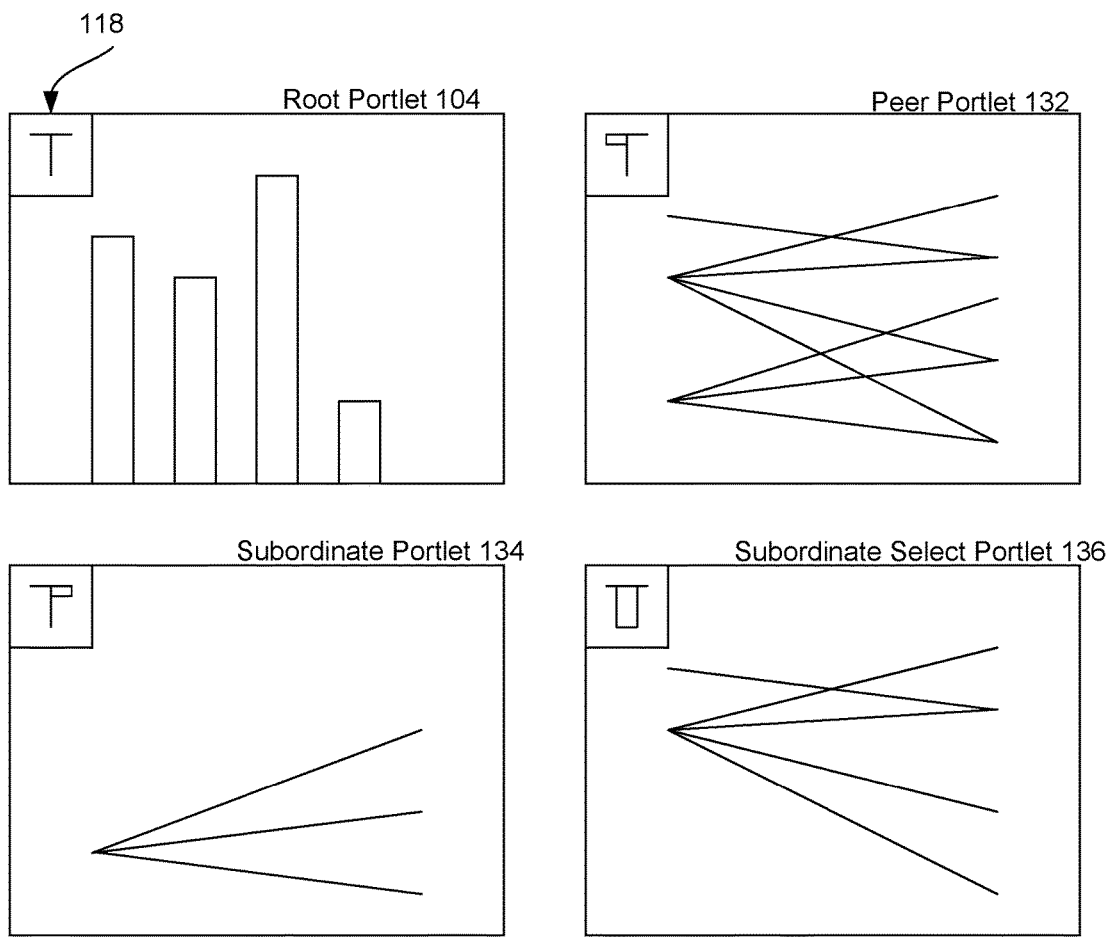
FIG. 12 depicts an example of a portlet tree display.

Referring now to FIG. 12, an example of a portlet tree display is depicted. A portlet tree presents related portlets by breadth and depth, such as in sibling or generational relationships with each other. In the example depicted by FIG. 12, a root portlet 104 presents a bar graph to visualize an aggregation of information, such as network telemetry information and is the originating parent portlet for sibling and child portlets of the example embodiment. A child portlet initiator 118 presented at root portlet 104 accepts a child portlet initiation command to initiate a selected of three types of child portlets. Activation of an arm of child portlet initiator 118 initiates a peer or sibling portlet 132 having a shared filter with root portlet 104 but a different visualization, such as a line graph showing network connections depicted by the bar graph of root portlet 104. Sharing an identical parent filter with root portlet 104 allows peer portlet 132 to present different visualizations of the root data generated by the parent filter while maintaining presentation of the root portlet 104. The presentation of information in the root portlet 104 and peer child portlet 132 stays synchronized with each other and provides a tool for an end user to create multiple trees of children from the same parent filter that presents root portlet 104 to investigate by drilling down into different portions of the root data through different peer child portlets 132. Activation of an opposing arm of child portlet initiator 118 initiates a subordinate child portlet 134 that inherits the filter from its root portlet 104 and adds an additional filter set for reducing the information presented by root portlet 104. Subordinate portals 134 allow an end user to drill down into specific portions of the root data and present the drilled down subordinate data with a visualization and settings more appropriate for a precise analysis. Activation of a leg of child portlet initiator 118 initiates a subordinate select child portlet 136. Subordinate select portlet 136 may also be presented by selecting a portion of root portlet 104 for more précised viewing, such as by selecting a bar of the bar graph. The subordinate select child portlet 136 applies the parent filter and then applies a child filter that identifies data desired for presentation, such as the data associated with the bar of a bar graph or all of the data except the data associated with the bar of the bar graph. In each child, updates to data of the root 104 results in synchronization of the data presented by the child.

In one embodiment, portlets aid in visualization and analysis of telemetry information by relating portions of data that do not have a defined relationship. For example, a portlet visualization of a portion of data based upon a filter having a label and operand is applied to other portions of data without similar data and operand relationships by translating the filter of the first portlet to the use as the filter of the second portlet. A filter translator provides a tool for creating, deleting or modifying relationships of existing portlets to adapt a visualization of existing portlets to other data. An example of a filter translator is the translation of a filter for data kept by the hour to use with data kept by the minute. Other more complex filter translators apply a function as a filter translator that operates on data of one set to generate data comparable to that presented by the portlet visualization. In alternative embodiments, various translation filters may be used so that visualizations of data tracked by different parameters provide a meaningful comparison, thus allowing repetition of the use of portlet tools across different data.

Although the present invention has been described in detail, it should be understood that various changes, substitutions and alterations can be made hereto without departing from the spirit and scope of the invention as defined by the appended claims.

What is claimed is:

1. A method for managing network information for interaction with a network security platform, the method comprising:
    storing the network information as plural objects in random access memory in non-serialized form;
    accessing at least some of the plural objects from the random access memory with the network security platform;
    selectively converting less than all of the plural objects into a serialized form for storage in the random access memory;
    maintaining the less than all of the plural objects having the serialized form in the random access memory for a predetermined time; and
    accessing within the predetermined time at least one of the less than all of the plural objects that were converted into serialized form with the network security platform from the random access memory to detect a network security threat, the accessing performed at least in part by converting the at least some of the less than all of the plural objects from the serialized form to the non-serialized form.

2. The method of claim 1 wherein selectively converting further comprises:
    analyzing one or more predetermined conditions; and
    selecting one or more of the plural objects to convert to serialized form based upon the predetermined conditions.

3. The method of claim 2 wherein the predetermined conditions comprise a measure of the complexity of attribute values of the plural objects, and selecting comprises selecting objects to convert to serialized form that have a smaller measure of complexity relative to unselected objects.

4. The method of claim 2 wherein the predetermined conditions comprise the recency of access of the plural objects by the network security platform and selecting comprises selecting objects to convert to serialized form based at least in part on the recency of access by the network security platform relative to unselected objects.

5. The method of claim 2 wherein the predetermined conditions comprise the length of time of storage of the plural objects in the random access memory, and selecting comprises selecting objects to convert to serialized form that have a greater time of storage relative to unselected objects.

6. The method of claim 1 wherein the random access memory is a dynamic random access memory.

7. The method of claim 1 wherein selectively converting less than all of the plural objects into a serialized form in the active memory further comprises:
    maintaining at least some of the plural objects with attribute values having fully-realized objects; and
    converting at least some of the plural objects from attribute values having fully-realized objects to objects stored in serialized form without per-object overhead.

8. The method of claim 1 wherein selectively converting less than all of the plural objects into a serialized form in the active memory further comprises:
    maintaining at least some of the plural objects with attribute values having fully-realized objects; and
    converting at least some of the plural objects from attribute values having fully-realized objects to a fully serialized object with shared context to interpret the serialized representation.

9. The method of claim 6 wherein selectively converting less than all of the plural objects into a serialized form in the active memory further comprises:
    maintaining at least some of the plural objects with attribute values having fully-realized objects; and
    converting at least some of the plural objects from attributes having full-realized objects to plural fully serialized objects compressed into one or more pages.

* * * * *